(12) United States Patent
Frugier et al.

(10) Patent No.: US 10,095,027 B2
(45) Date of Patent: Oct. 9, 2018

(54) METHOD OF DESIGNING AN IMAGING SYSTEM, SPATIAL FILTER AND IMAGING SYSTEM INCLUDING SUCH A SPATIAL FILTER

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

(72) Inventors: Pierre-Antoine Frugier, Sceaux (FR); Patrick Mercier, Orsay (FR); Pierre Chavel, Orsay (FR); Francois Goudail, Palaiseau (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/193,400

(22) Filed: Jun. 27, 2016

(65) Prior Publication Data

US 2016/0377861 A1 Dec. 29, 2016

(30) Foreign Application Priority Data

Jun. 26, 2015 (FR) ...................................... 15 55976

(51) Int. Cl.
*G02B 27/00* (2006.01)
*H04N 5/369* (2011.01)
(Continued)

(52) U.S. Cl.
CPC ..... *G02B 27/0075* (2013.01); *G02B 27/0012* (2013.01); *G02B 27/0988* (2013.01);
(Continued)

(58) Field of Classification Search
CPC .......... H04N 5/23235; H04N 5/23212; H04N 5/369; G02B 27/0012; G02B 27/46; G02B 27/0075; G02B 27/0988
See application file for complete search history.

(56) References Cited

U.S. PATENT DOCUMENTS

| 5,748,371 A | * | 5/1998 | Cathey, Jr. | ............ G01S 3/7835 356/3 |
| 6,907,124 B1 | * | 6/2005 | Gluckstad | .............. G02B 27/46 359/2 |

(Continued)

FOREIGN PATENT DOCUMENTS

| FR | 2 919 733 A1 | 2/2009 |
| WO | 2015/004659 A1 | 1/2015 |

OTHER PUBLICATIONS

Yang et al.: "Optimized phase pupil masks for extended depth of field", Optics Communications, 2007, pp. 56-66.

(Continued)

*Primary Examiner* — Luong T Nguyen
(74) *Attorney, Agent, or Firm* — Young & Thompson

(57) ABSTRACT

A method of designing an imaging system including an optical system having a longitudinal optical axis, an image sensor and a spatial filter, the imaging system being configured to form an image of a focusing plane on the image sensor. The optical transfer function of the optical system combined with the spatial filter is calculated as a function of the image spatial frequencies, and of the focusing defect ($\Psi$), so as to determine a contrast map and a phase map of the optical system combined with the pupil function of the spatial filter, the contrast map and the phase map being a function, of the spatial frequency (f), and of the focusing defect ($\Psi$), and it is determined, based on these maps, a value of longitudinal extension (|P|) of the imaging system (Continued)

focusing depth domain in the useful range of spatial frequencies ($[-fc; fc]$) and an average contrast $\overline{C}$.

20 Claims, 6 Drawing Sheets

(51) Int. Cl.
*G02B 27/09* (2006.01)
*H04N 5/232* (2006.01)
*G02B 27/46* (2006.01)

(52) U.S. Cl.
CPC ......... *G02B 27/46* (2013.01); *H04N 5/23212* (2013.01); *H04N 5/23235* (2013.01); *H04N 5/369* (2013.01)

(56) References Cited

U.S. PATENT DOCUMENTS

| | | | |
|---|---|---|---|
| 7,336,430 B2 * | 2/2008 | George | G02B 27/0075 359/626 |
| 2011/0164323 A1 | 7/2011 | Liege et al. | |
| 2014/0184859 A1 * | 7/2014 | Sakita | H04N 5/217 348/241 |

OTHER PUBLICATIONS

FR Search Report, dated May 23, 2016, from corresponding FR application.

\* cited by examiner

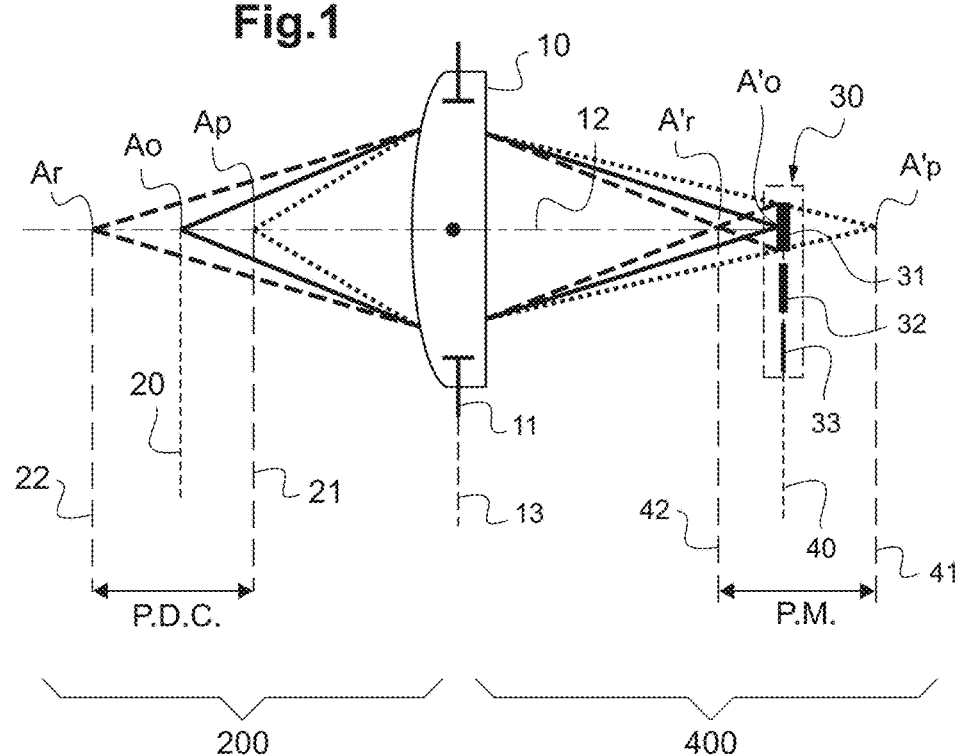
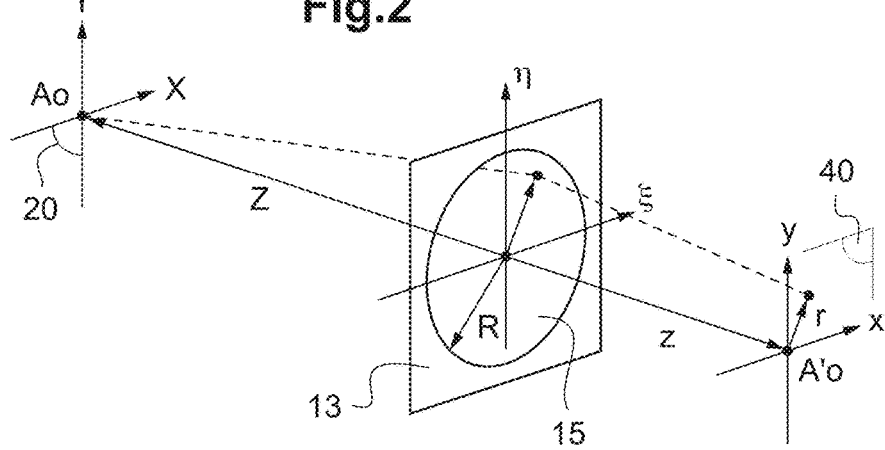

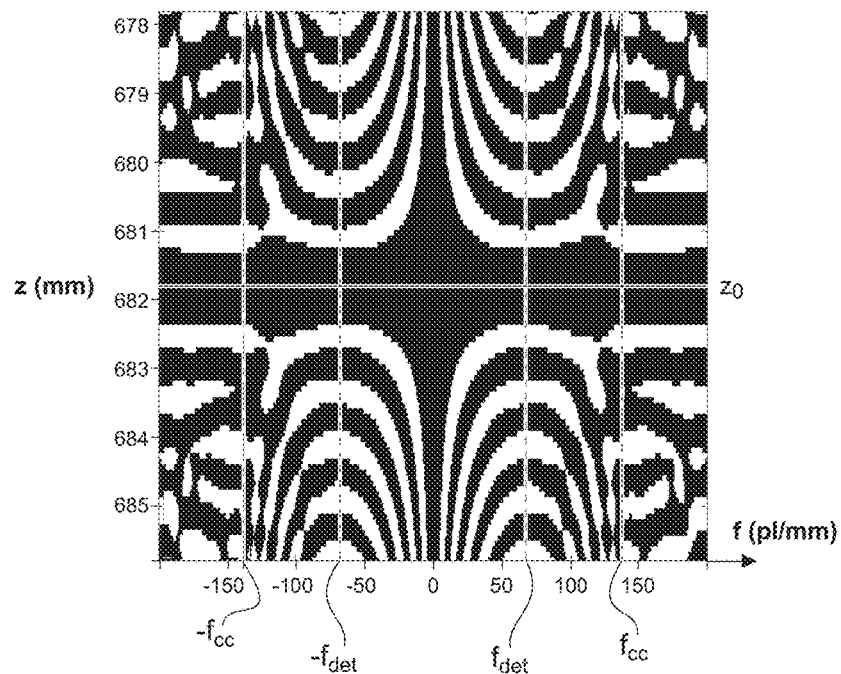
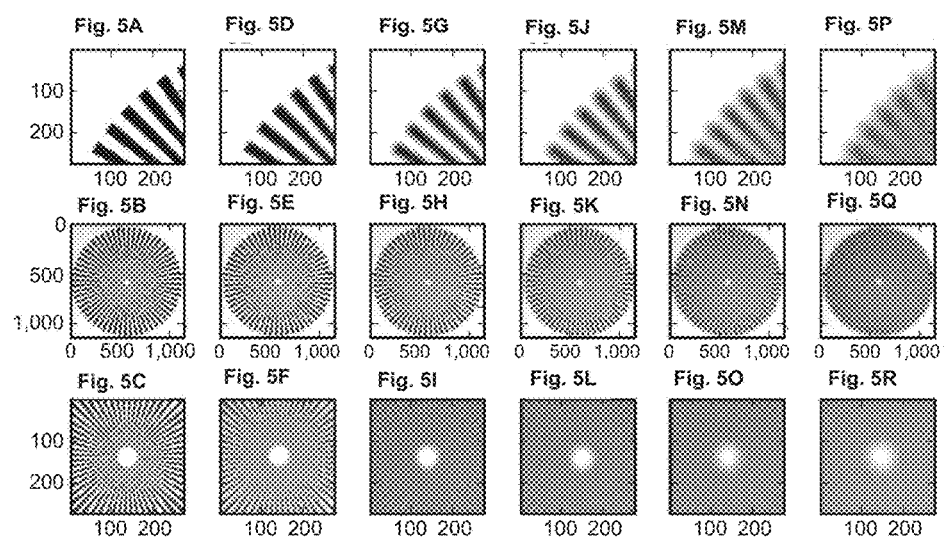

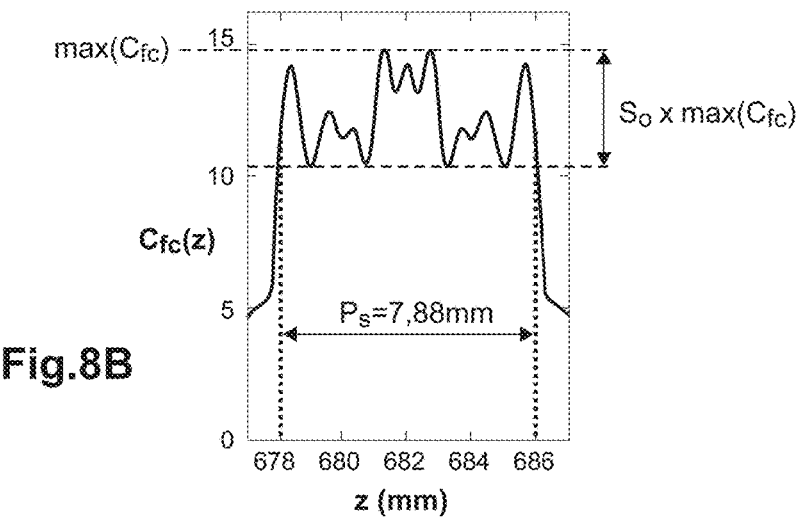
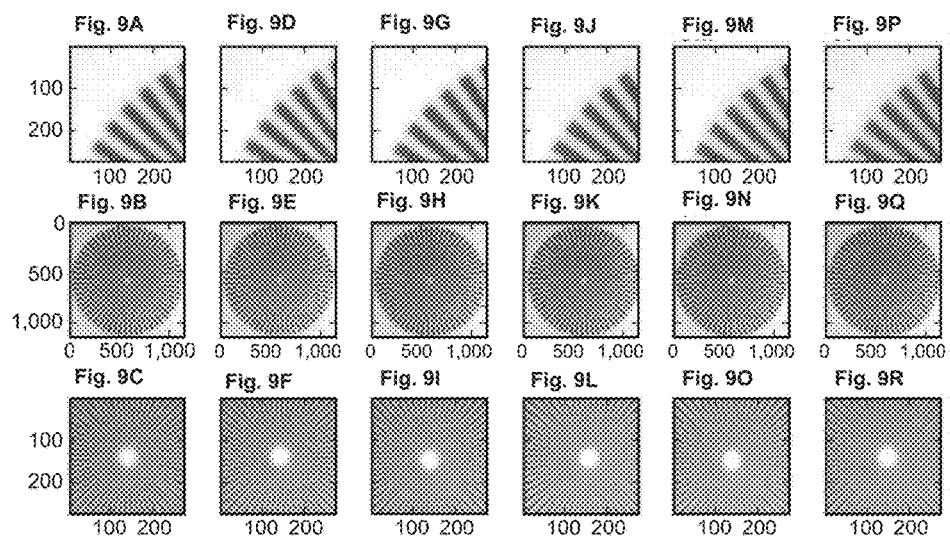

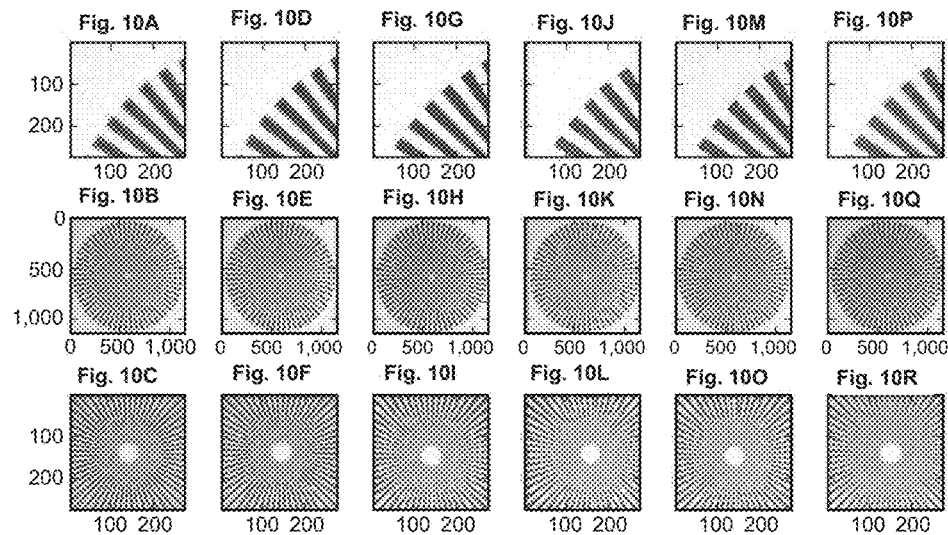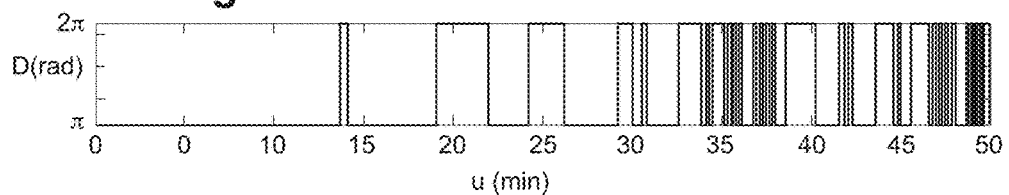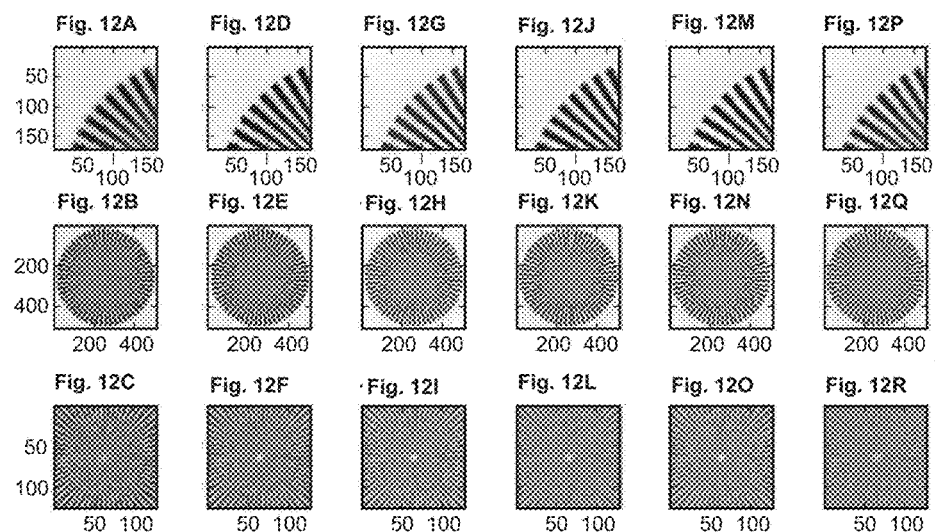

METHOD OF DESIGNING AN IMAGING SYSTEM, SPATIAL FILTER AND IMAGING SYSTEM INCLUDING SUCH A SPATIAL FILTER

TECHNICAL FIELD TO WHICH THE INVENTION RELATES

The present invention generally relates to the field of optical imaging systems. It more particularly relates to an imaging system comprising a spatial filter adapted to modify the depth of field and/or the focusing depth of an imaging system with or without digital image post-processing.

It relates in particular to a method of designing an imaging system comprising a spatial filter of the phase-mask type. The invention also relates to an imaging system including such a spatial filter.

TECHNOLOGICAL BACKGROUND

FIG. 1 schematically shows an optical imaging system. Simplified to the minimum, this imaging system includes an optical system 10 and an image sensor 30. In the example shown, the optical system 10 is consisted of a single lens with a symmetry of revolution about an optical axis 12. The optical system 10 may include an assembly of several lenses or other optical components. A pupil 11 delimits the aperture of the optical system 10. Generally, the centre O of the pupil 11 is placed on the optical axis 12. The image sensor 30 comprises at least one elementary sensor 31, 32, 33. By elementary sensor, it is understood herein a sensor having a resolving element in a least one spatial direction. The image sensor 30 is arranged in a sensing plane 40, generally transverse to the optical axis 12. A light source (not shown) illuminates an object located in the object space 200. The optical system 10 forms an image of this object in the image space 400. More precisely, the optical system 10 optically conjugates the sensing plane 40 with an object plane 20. The focusing depth PM of the imaging system is defined as being the longitudinal interval of the image space 400 for which a given image sensing system 30 senses no or a little blurring in the sensed image. In the object space 200, the depth of field PDC of the imaging system is defined based on the focusing depth PM by applying the usual relations of optical conjugations. The focusing depth PM depends on the specifications of the optical system (focus, object-image optical conjugation, numerical aperture), on the wavelength λ of the optical beam and on the spatial extension of the resolving element of the image sensor 30.

Schematically, it has been shown in FIG. 1 a sensing system 30 formed, for example, of a planar matrix of elementary sensors 31, 32, 33, or pixels (CCD or CMOS), a strip of pixels or a single sensor (photodiode), of predetermined size. The pixel 31 is arranged in the sensing plane 40, at the intersection with the optical axis 12. The pixel 31 senses the image $A'_0$ of a point $A_0$ located at the intersection of the optical axis 12 with the focusing plane 20. The optical system 10 optically conjugates the focusing plane 20 of the object space with the sensing plane 40 of the image space. Hence, the sensing plane 40 is a plane transverse to the optical axis 12 and optically conjugated with the object plane 20. Similarly, a point Ap, respectively Ar, located in an object plane 21, respectively 22, is optically conjugated with a point A'p, respectively A'r, located in an image plane 41, respectively 42. By definition, the points Ar and A'p corresponding to the ends of the geometrically calculated axial area of focusing depth PM, the transverse size of the optical beam forming the image at the point Ar and A'p has a size equal to the size of the pixel 31, in the sensing plane 40. Hence, the sensing system senses no degradation of the image quality between the object planes 20, 21 and 22. The depth of field PDC geometrically corresponds to the distance along the optical axis 12, between the object plane 21 and the object plane 22 for with the image through the optical system 10 has the transverse size of one pixel 33 of the sensing system 30.

A simple geometric analysis shows that the focusing depth PM depends on parameters such as in particular: the numerical aperture of the optical system, the characteristic size of the elementary sensor and the magnification of the optical system.

Different techniques exist for increasing the depth of field of an optical imaging system. Apodizer-type spatial filters are known, which are placed in the plane of the optical system pupil. An apodizer filter is generally a transmission spatial filter having an amplitude distribution that allows suppressing the secondary rings of the diffraction pattern produced by an optical system at one image point.

In FIG. 2 are shown the geometric reference systems used for evaluating the amplitude of the impulse response in the image field, near the focusing plane, of an optical system having a given pupil function 15.

An imaging system is considered, comprising an optical system of focal length F forming the image of a point $A_0$ at an image point $A'_0$. The imaging system further includes a spatial filter or optical mask. This optical mask is arranged near the plane of the optical system pupil or in a plane optically conjugated with the plane of the optical system pupil. The optical mask generates a complex pupil function 15 liable to modify in amplitude and phase the impulse response of the imaging system. This complex pupil function 15 is noted $D(\xi, \eta)$, where $\xi, \eta$ are the Cartesian coordinates in the plane 13 of the pupil 11.

A focusing defect is herein defined by the corresponding phase-shift $\Psi(z, Z)$ of the optical wave at the edge of the pupil 11 with respect to the wave front of the conjugated point $A'_0$. The pupil has a circular shape centred to the optical axis 12 and of minimum radius R. By definition:

$$\Psi(z, Z) = \frac{\pi R^2}{\lambda}\left(\frac{1}{z} + \frac{1}{Z} - \frac{1}{F}\right) = \frac{2\pi}{\lambda} w_{20}$$

where $w_{20}$ represents the normal spacing, expressed in number of wavelengths, with respect to the reference sphere at the edge of the pupil due to the focusing defect.

In the Fresnel approximation, the expression of the complex amplitude of the electromagnetic field in the image space is given by the equation (2):

$$U(Z, x, y, z) \propto \frac{1}{\lambda^2 \cdot zZ} \cdot e^{j\frac{k \cdot (x^2+y^2)}{2z}} \cdot e^{j\frac{k \cdot (X^2+Y^2)}{2Z}} \times \iint_{pupil} D(\xi, \eta) \cdot e^{j\frac{k \cdot (\xi^2+\eta^2)}{2}\left(\frac{1}{Z}+\frac{1}{z}-\frac{1}{F}\right)} \cdot e^{-ik\left[\left(\frac{x}{Z}+\frac{x}{z}\right)\xi + \left(\frac{Y}{Z}+\frac{y}{z}\right)\eta\right]} \cdot d\xi \cdot d\eta$$

It is searched to determine a spatial filter of the phase-mask type for extending the focusing depth or, equivalently, extending the depth of field of an imaging system. Expressed mathematically, this problem amounts to define in the pupil plane a phase profile $D(\xi, \eta)$ such that, for a given object point, the optical field near the conjugate image point has a property of invariance along the optical axis:

$$\frac{\partial |U(x,y,z)|^2}{\partial z} = 0 \,\forall\, x, y \text{ for any } z \in PM \quad (3)$$

Generally, the equation (3) has no analytic solution.

The problem mentioned hereinabove may be formulated more simply in the case of an optical system with a symmetry of revolution and for an object point A located in the field of the system. A system of cylindrical coordinates is introduced and, in the pupil plane, the reduced radius is denoted ρ, defined by $$\rho = \frac{\sqrt{\xi^2 + \eta^2}}{R},$$

with R the maximum radius of the pupil.

The equation (2) is hence reformulated:

$$U(Z, r, z) = \frac{2\pi R^2}{\lambda^2 \cdot zZ} e^{i\frac{k \cdot r^2}{2z}} \int_0^1 D(\rho) \cdot e^{i\Psi(z,Z)\cdot\rho^2} \cdot J_0\left(\frac{kR}{z}\cdot r\cdot\rho\right)\cdot\rho\cdot d\rho$$

The normalized intensity is expressed as:

$$I(Z, r, z) = \frac{1}{I_0}\left|\int_{0\Delta}^1 D(\rho)\cdot e^{i\Psi(z,Z)\cdot\rho^2}\cdot J_0\left(\frac{kR}{z}\cdot r\cdot\rho\right)\cdot\rho\cdot d\rho\right|^2$$

where $I_0$ represents the intensity on the axis, limited by the diffraction, in the sensing plane of the imaging system with no spatial filter in infinite-focus conjugation.

In the case of an optical system that is not centred or that has such a numerical aperture that the Fresnel approximation does not apply, other models of distribution of the intensity I(Z, x, y, z) exist, which are well known by the one skilled in the art (see, for example, the Extended Nijboer-Zernike, ENZ, theory).

The publication J. Ojeda-Castaneda et al., "Ambiguity Function as a Design Tool for high focal depth", Appl. Opt., Vol. 27, No. 4, 1988 describes an apodizer-type spatial filter, which modifies the amplitude of the pupil to modify the impulse response. More precisely, this publication compares the performances of the different apodizer filters allowing a stabilization of the response for a focusing defect of the order of 1λ, which corresponds to |Ψ|≤6.28. These amplitude apodizer filters have for main drawback to induce an attenuation of the luminosity of the imaging system and hence to strongly reduce the photometric efficiency of the imaging system.

Another publication describes a phase mask of polynomial profile, which allows stabilizing the point spread function (PSF) according to Ψ. The publication Cathey, E. Dowski, New Paradigm for Imaging System, Appl. Opt., Vol. 41, 2002, proposes, within the framework of the contemplated approximations, a phase mask having a polynomial spatial distribution of phase of order 3 in the plane of the pupil, or cubic phase mask, and introducing a defect of amplitude higher than 20 radians, which allows obtaining a defocusing range evaluated to |Ψ|≤30, i.e. a defocusing gain of a factor 10. Nevertheless, such cubic phase masks require a deconvolution of the sensed image by the resulting point spread function (PSF). These results have subsequently been extended to logarithmic profiles having analogous performances.

This type of phase mask has another drawback. Although the impulse response is almost-invariant in shape, the position of the barycentre of the impulse response is offset along the longitudinal axis. This offset produces a significant distortion of the image that cannot be corrected, even digitally, because it depends on the three-dimensional position of each object point. Finally, these masks are generally expensive to produce, because they must generally be performed by diamond machining.

The publication H. Wang et al., "High Focal Depth with a Pure-Phase Apodizer", Appl. Optics, Vol. 40, No. 31, 2001, proposes a phase mask consisted of three concentric rings having binary phase-shifting between 0 and π. This phase mask, of simple manufacturing, produces no image distortion. The application of the diffraction theory allows calculating the distribution of intensity along the longitudinal optical axis of the optical system, for different values of the normalized radius a and b of the two internal rings. By a trial and error approach, the determination of optimized values of a and b allows making the axial distribution of intensity I(z, x=0, y=0) uniform and extending the depth of field. However, this method does not allow evaluating the distribution of intensity in the whole image field, and hence does not guarantee optimum performances in terms of spatial resolution. This type of phase mask finds applications in confocal beam-scanning microscopy, where a point by point image is formed. Combined with a post-processing of the image, such a mask allows extending the focusing defect to |Ψ|≤7.6 i.e. a defocusing gain of a factor two.

The use of such a ring phase mask has two limitations: on the one hand, the performance in terms of extension of the depth of field and/or of focusing depth remains limited, and on the other hand, in imaging, the criterion of invariance of the intensity is not sufficient to obtain an image of quality over the whole image field. Finally, the step of deconvolution requires an additional step in the chain of processing of the image.

Moreover, there also exist digital methods of image processing for allowing increasing the spatial resolution or the contrast of an imaging system. However, these methods involve a digital post-processing that is generally incompatible with the direct use (with no deconvolution) of the imaging system. These methods have limited performances.

Hence, a need exists for a method of designing a spatial filter making it possible to modify (extend or reduce) the depth of field and/or the focusing depth of an imaging system while ensuring an invariance of the image quality over this modified depth of field and/or modified focusing depth. Preferably, the imaging system allows obtaining an image on the area of modified depth of field and/or modified focusing depth, with no image post-processing.

In particular, it is desirable to extend the range of the focusing defects tolerated for an existing imaging system, so as to facilitate the manufacturing and the focusing settings of this imaging system and to extend the depth of field and/or the focusing depth of this imaging system without introducing a distortion or a degradation of the image quality.

More precisely, it is desirable to extend the depth of field of an imaging system with no image post-processing to obtain a depth of field extension at least as great as in the prior systems requiring a post-processing. Moreover, it is desirable to significantly extend the depth of field of an imaging system combining a spatial filter and a post-processing by comparison with the results obtained in the prior art systems.

There also exists a need for a spatial filter intended to be combined with an imaging system, the spatial filter being easy to manufacture, making it possible to modify the field and/or focusing depth of the imaging system, with no degradation of the image quality along the longitudinal optical axis of the optical system.

OBJECT OF THE INVENTION

In order to remedy the above-mentioned drawback of the state of the art, the present invention proposes a method of designing an imaging system comprising an optical system having a longitudinal optical axis, an image sensor and a spatial filter, the imaging system being configured so as to form an image of a focusing plane on the image sensor, the method comprising the following steps:
- a) initializing a longitudinal position of the focusing plane and a longitudinal position of the image sensor, the optical system optically conjugating the longitudinal position of the focusing plane and the longitudinal position of the image sensor (30) on the longitudinal optical axis;
- b) initializing a pupil phase function of the spatial filter in the pupil plane of the optical system,
- c) calculating an optical transfer function of the optical system combined with the spatial filter, as a function, on the one hand, of the spatial frequency, and on the other hand, of the focusing defect;
- d) determining a contrast map and a phase map, the contrast map being equal to the module of the optical transfer function as a function, on the one hand, of the spatial frequency, and on the other hand, of the focusing defect, and the phase map being equal to the argument of the optical transfer function as a function, on the one hand, of the spatial frequency, and on the other hand, of the focusing defect;
- e) determining, from the contrast map and/or the phase map obtained at step d), a focusing depth domain of the imaging system in the useful range of spatial frequency and calculating a value of longitudinal extension of said focusing depth domain;
- f) evaluating a merit function of said pupil phase function of the spatial filter as a function of the value of longitudinal extension of the imaging system focusing depth domain in the useful range of spatial frequencies;
- g) reiterating steps b) to f) for another pupil phase function of the spatial filter;
- h) selecting, from a plurality of evaluations of the merit function corresponding to a plurality of pupil phase functions of the spatial filter, respectively, a determined pupil phase function allowing the imaging system to have a determined value of longitudinal extension of the focusing depth domain in the useful range of spatial frequencies.

More particularly, step d) comprises the following steps:
- i) initializing a contrast threshold, a phase-shift threshold and a contrast average variation threshold;
- j) determining, from the contrast map calculated at step d), a first focusing depth domain, for which the contrast value is higher than or equal to the contrast threshold in the useful range of spatial frequencies;
- k) determining, from the phase map calculated at step d), a second focusing depth domain, for which the phase is lower than or equal to the phase-shift threshold in the useful range of spatial frequencies;
- l) determining a third focusing depth domain, for which the average variation of contrast averaged in the useful range of spatial frequencies is lower than or equal to the contrast average variation threshold;

wherein step e) comprises the following step:
- m) determining the focusing depth domain by intersecting the first focusing depth domain with the second focusing depth domain and with the third focusing depth domain, and wherein step f) comprises the following step:
- n) calculating, as a function of the focusing defect, the average contrast of the imaging system averaged in the useful range of spatial frequencies and for said focusing depth domain determined at step m);
- o) evaluating a merit function representative of said pupil phase function of the spatial filter, the merit function being function, on the one hand, of the value of longitudinal extension of the imaging system focusing depth domain determined at step m), and on the other hand, of the average contrast calculated at step n) in the useful range of spatial frequencies.

Other non-limitative and advantageous characteristics of the method of designing an imaging system comprising a spatial filter according to the invention, taken individually or according to all the technically possible combinations, are the following:
- the pupil is of circular shape centred on the optical axis and the pupil phase function of the spatial filter has a symmetry of revolution about the optical axis or a partial symmetry of revolution, the pupil phase function of the spatial filter being decomposed into angular sectors;
- the pupil phase function of the spatial filter includes a series of discrete phase values;
- the pupil phase function of the spatial filter includes binary phase values;
- the pupil phase function of the spatial filter is a polynomial function of the radial distance with respect to the centre of the pupil;
- the pupil of the optical system is asymmetric about the optical axis and the contrast map includes a real map and an imaginary map;
- step g) of evaluating a merit function includes a step of calculating the product of the value of longitudinal extension of the focusing depth domain by the average contrast affected by a digital power coefficient, this digital power coefficient being a real number;
- the method includes a step of determining a value of longitudinal extension of the depth of field domain as a function of the value of longitudinal extension of the focusing depth domain.

The invention also proposes a spatial filter for an imaging system comprising an image sensor and an optical system having a pupil plane, the spatial filter being intended to be placed in the pupil plane or in a plane optically conjugated with the pupil plane, the spatial filter forming a phase mask in the pupil plane adapted to modify a contrast map and/or a phase map of the imaging system over a focusing depth domain and over a useful range of spatial frequencies, the contrast map being equal to the module, respectively the phase map being equal to the phase, of the optical transfer function of the optical system combined with the spatial filter, as a function, on the one hand, of the spatial frequency, and on the other hand, of the focusing defect, having a value of longitudinal extension of the focusing depth domain, as calculated at step e) hereinabove, higher, respectively lower, by a multiplication, respectively division, factor, at least equal to 2 and preferably at least equal to 10, than the geometrically calculated focusing depth of said imaging system without said spatial filter.

The invention also proposes an imaging system comprising an optical system, an image sensor and a spatial filter arranged near a pupil plane of the optical system or in a plane optically conjugated with the pupil plane of the optical system, the imaging system being configured to form an image of a focusing plane on the image sensor.

More particularly, according to the invention, the spatial filter forms, in the pupil plane, a phase mask having a pupil phase function, said pupil phase function being determined according to the method of the invention so that the optical system combined with the spatial filter has a determined focusing depth domain over a useful range of spatial frequencies having a value of longitudinal extension, as calculated at step e) hereinabove, higher, respectively lower, by a multiplication, respectively division factor, at least equal to 2 and preferably at least equal to 10, than the geometrically calculated focusing depth of said imaging system without said spatial filter.

According to a particular and advantageous aspect, the imaging system further includes an image acquisition system adapted to acquire a digital image sensed by the image sensor and an image processing system configured to apply a digital post-processing to the digital image acquired by the image acquisition system, the digital post-processing being function of the spatial filter associated with said value of longitudinal extension of the focusing depth domain and with the average contrast.

According to a particular and advantageous embodiment, the imaging system includes a spatial phase modulator, the spatial phase modulator being configured to form said spatial filter and said spatial phase modulator being able to be dynamically modulated.

DETAILED DESCRIPTION OF AN EMBODIMENT

The following description in relation with the appended drawings, given by way of non-limitative examples, will allow a good understanding of the invention and of how it can be implemented.

In the appended drawings:

FIG. 1 shows a longitudinal sectional view of an imaging system of the prior art, with no phase mask, this imaging system defining a focusing depth and a depth of field;

FIG. 2 schematically shows the geometric reference systems used for evaluating the impulse response in an imaging system having a pupil function;

FIG. 4B shows an example of phase map in the image plane corresponding to a same imaging system with no phase mask;

FIGS. 5A-5R show Siemens test chart images acquired by means of the imaging system with no phase mask, whose contrast map is shown in FIG. 4A and phase map is shown in FIG. 4B;

Figure 6:
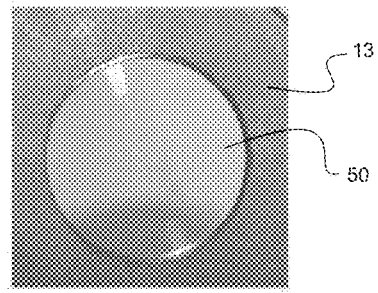
FIG. 6 shows a picture of a first example of phase mask according to an embodiment of the invention.
Figure 7:
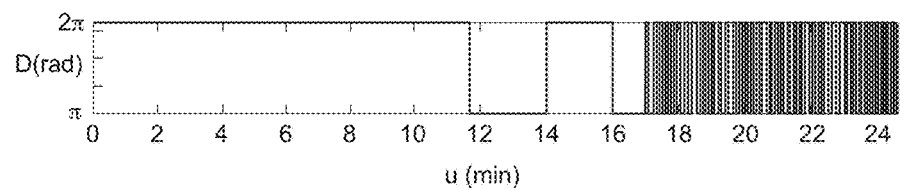
Figure 8A:
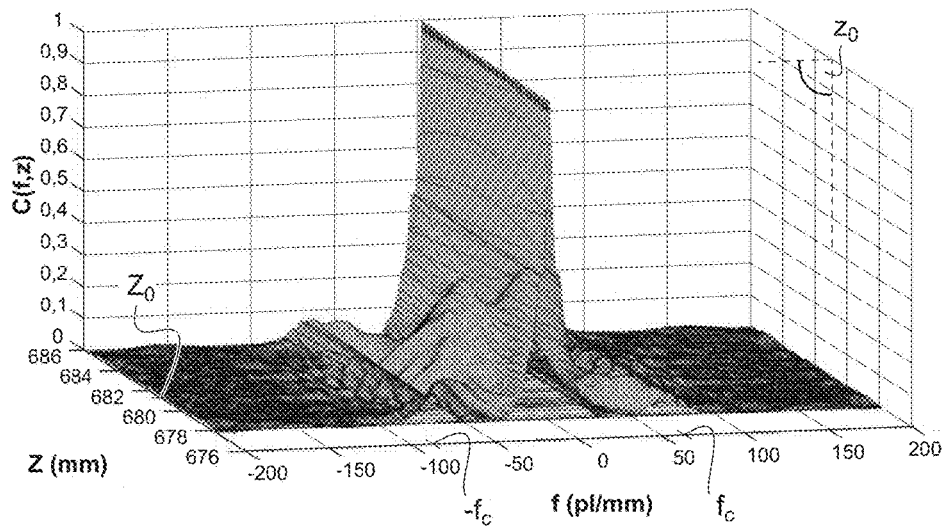

FIG. 7 schematically shows the radial phase profile of the phase mask of FIG. 6;

FIG. 8A shows the contrast map as a function of the spatial frequency and of the focusing defect for an imaging system comprising the phase mask shown in FIGS. 6 and 7; FIG. 8B shows a curve of longitudinal profile of contrast averaged in the useful range of spatial frequencies as a function of the focusing defect;

FIGS. 9A-9R show Siemens test chart images acquired by means of the imaging system comprising the phase mask shown in FIGS. 6 and 7, these images being obtained with no post-processing;

FIGS. 10A-10R show Siemens test chart images experimentally acquired by means of the imaging system comprising the phase mask shown in FIGS. 6 and 7, these images being obtained with a digital post-processing;

FIG. 11 schematically shows a second example of radial profile of phase mask according to a variant of an embodiment of the invention;

FIGS. 12A-12R show Siemens test chart images acquired by means of the imaging system comprising the phase mask whose radial phase profile is shown in FIG. 11, these images being obtained with a digital post-processing.

METHOD

The present invention proposes a method for designing an optical imaging system comprising a phase pupil mask making it possible to modify the depth of field of the optical imaging system while ensuring the invariance of the image quality over this modified depth of field. According to the applications, this method may be implemented to extend or reduce the depth of field of an optical imaging system.

In the following of the present disclosure, an imaging system is considered, which comprises an optical system, an imaging sensor arranged in a sensing plane and possibly a spatial filter of the phase mask type arranged in the plane of the optical system pupil or in an optically conjugated plane. The imaging system is configured to form an image of the focusing plane 20 in the sensing plane 40.

The performances of the imaging system (with or without phase mask) are evaluated by means of a contrast map that shows the contrast variations not only as a function of the focusing defect on the axis, but also as a function of the spatial frequency. The phase mask is hence shown as an operator of contrast map of the imaging system and the method described hereinafter is used for calculating it.

The evolution of the optical transfer function (FTO) of the optical system, possibly combined with the pupil phase mask, is estimated according to the focusing defect. The FTO may be evaluated by autocorrelation of the pupil function for different values of the focusing defect. In the case of an optical system with a symmetry of revolution, the FTO may for example be deduced directly from the distribution of the intensity on the axis I(Z,r,z) by the equation:

$$FTO(Z,f,z) = 2 \cdot TF \circ TA(I(Z,r,z)) \tag{2.3}$$

where TF is the Fourier transform and TA is the Abel operator:

$$TA(f(r)) = \int_x^\infty f(r) \cdot \frac{r}{(r^2 - x^2)} \, dr = g(x)$$

The FTO is generally complex. In the following of the present disclosure, the module of the optical transfer function (FTO) is named contrast map and its argument is named phase map.

Figure 3:
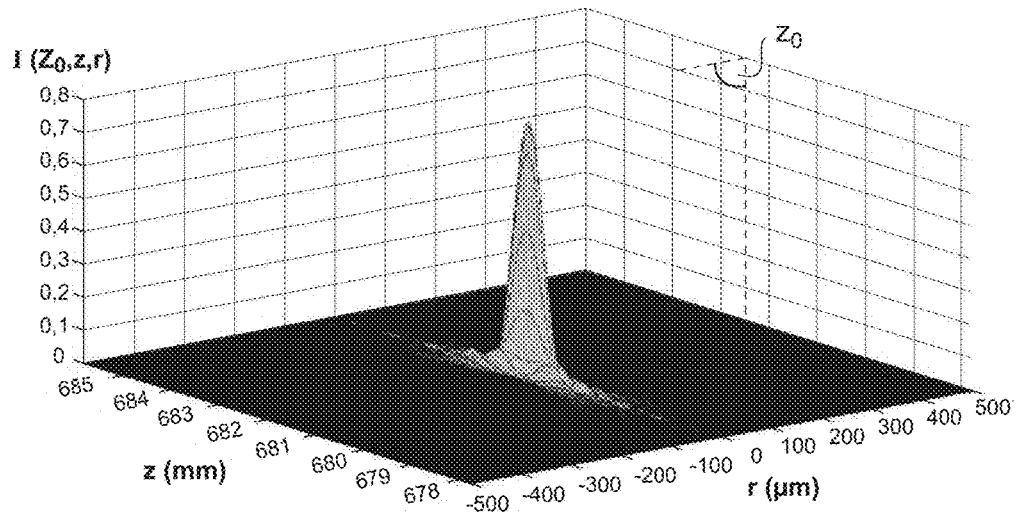
FIG. 3 shows an example of longitudinal distribution of intensity as a function of the radial distance to the optical axis and as a function of the focusing defect, near the focusing plane.
Figure 4A:
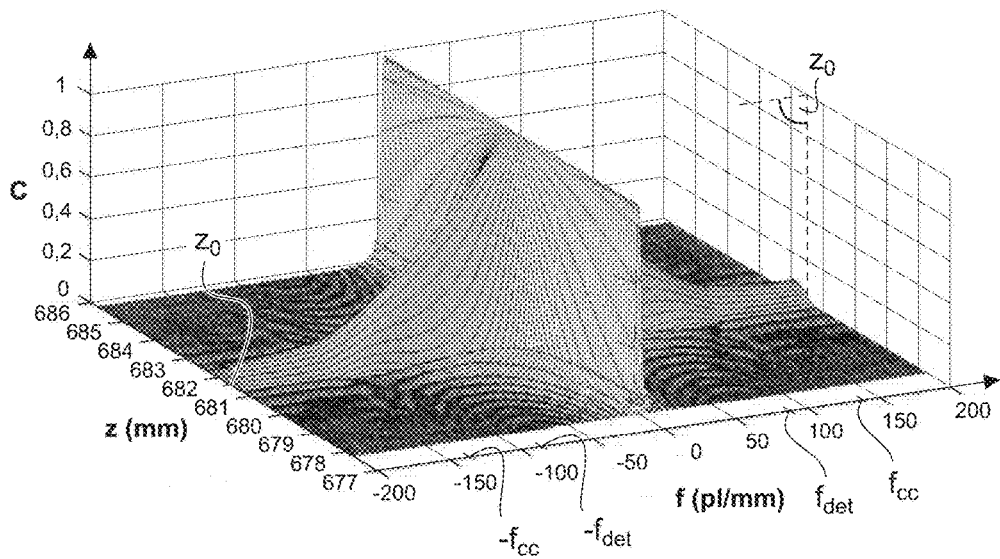
FIG. 4A shows an example of contrast map as a function of the spatial frequency and of the focusing defect, for an imaging system with no phase mask.

By way of example, a reference imaging system is considered, as shown in FIG. 1, which comprises a lens 10 of focal distance F=600 mm., with a circular pupil of diameter R=25 mm, with no phase mask, forming the image of an object located at a distance of $Z_0$=5 m in the sensing plane located at the position $z_0 \approx$ 681.81 mm. FIG. 4A shows a contrast map of this reference imaging system as a function of the spatial frequency f and as a function of the focusing defect z, near the focusing plane ($z_0 \approx$ 681.81 mm). In FIGS. 4A and 4B are shown the spatial frequencies ($-f_{det}$, $f_{det}$) corresponding to the spatial resolution of the image sensor, and respectively, the spatial cut frequencies ($-f_{cc}$, $f_{cc}$) corresponding to the theoretical limit of diffraction of the optical system at the wavelength of use. The sensing plane $z=z_0$ is shown. It is observed on the contrast map (FIG. 4A) that the contrast value decreases strongly for the useful spatial frequencies as soon as we go away from the focusing plane.

FIG. 4B shows a phase map corresponding to the same reference imaging system as a function, on the one hand, of the spatial frequency f, and on the other hand, of the focusing defect. The horizontal line corresponds to the sensing plane $z=z_0$. On this phase map, the black areas correspond to a zero phase, i.e. a positive contrast, and the white areas to a phase equal to π, i.e. an inversion of contrast. On this phase map, it is observed that the phase of the FTO remains constant (zero phase) at the close vicinity of the sensing plane ($z=z_0$) as a function of the spatial frequency, in particular in the useful range of spatial frequencies, herein [$-f_{det}$, $f_{det}$]. For a zero spatial frequency, the contrast phase also remains constant (zero phase) along the optical axis in the focusing defect range shown. However, the contrast phase of FIG. 4B varies strongly as soon as we go away from the sensing plane in the useful range of spatial frequencies. This phase map explains the contrast inversions occurring at certain spatial frequencies as a function of the focusing defect.

The contrast map (FIG. 4A) and the phase map (FIG. 4B) well illustrate the fact that the image quality of the imaging system with no phase mask is very rapidly degraded as soon as we go away from the focusing plane.

This new approach allows a better evaluation of the performances of an imaging system as a function of the focusing defect.

FIG. 5 shows a series of experimental acquisitions of a Siemens test chart performed with the reference imaging system for different values of focusing defect. The horizontal and vertical axes represent the number of pixels in the plane of the image sensor, herein consisted of about 1100× 1100 pixels.

FIGS. 5B, 5C, 5H, 5I, 5N, 5Q represent the complete image of the Siemens test chart and show all the spatial frequencies. FIGS. 5A, 5B, 5C illustrate images of a Siemens test chart arranged in the focusing plane, for a focusing defect |Ψ|=0. FIGS. 5D, 5E, 5F illustrate images of the same Siemens test chart for a focusing defect |Ψ|=±7.9. FIGS. 5G, 5H, 5I illustrate images of the same Siemens test chart for a focusing defect |Ψ|=±15.8. FIGS. 5J, 5K, 5L illustrate images of the same Siemens test chart for a focusing defect |Ψ|=±23.7. FIGS. 5M, 5N, 5O illustrate images of the same Siemens test chart for a focusing defect |Ψ|=±31.6. FIGS. 5P, 5Q, 5R illustrate images of a Siemens test chart for a focusing defect |Ψ|=±39.4.

FIGS. 5A, 5D, 5G, 5J, 5M, 5P represent a zoom on an off-centred area of 250×250 pixels in the image of the Siemens test chart, corresponding to the lowest spatial frequencies. FIGS. 5C, 5F, 5I, 5L, 5O, 5R represent a zoom on a central area of 250×250 pixels in the image of the Siemens test chart, corresponding to the highest spatial frequencies.

It can be visually observed in these images the contrast decrease as a function of the focusing defect from image 5A (|Ψ|=0) to image 5P (|Ψ|=±39.4), this decrease being more accentuated at the centre of the test chart (image 5R), i.e. at the high spatial frequencies. It can also be visually observed in these images contrast inversions occurring as a function of the focusing defect and as a function of the spatial frequencies.

The technical problem of modifying the depth of field or the focusing depth of an imaging system by mean of a phase mask arranged in the pupil plane or in a plane optically conjugated with the imaging system pupil may be reformulated by mean of this contrast map, possibly combined with the phase map. Extending the focusing depth of an imaging system amounts to make invariant the contrast and phase maps along the longitudinal axis (z) on either side of the line $z=z_0$ and in the useful range of spatial frequencies of the imaging system. The useful range of spatial frequencies [-fc; fc] of the considered imaging system is an input parameter fixed in accordance to the needs, it may in particular be determined as a function of the spatial cut frequency of the image sensor $f_{det}$. Preferably, it is desirable to avoid the phase inversions over the depth of field (or over the focusing depth) and over the useful domain of spatial frequencies.

Generally, to achieve the design of a phase mask for an imaging system, it is advisable to define input magnitudes, making it possible to define the wanted properties for the optical imaging system, and output magnitudes, to evaluate the results obtained according to a merit function.

To act specifically on the depth of field or on the focusing depth of the optical imaging system, these magnitudes are defined as follows.

1) Input Magnitudes

To evaluate the performance of different pupil phase masks within the meaning of the optical transfer function (FTO), input parameters are introduced, representing criteria.

first condition on the lower limit of the contrast ($C_0$)

A value of a minimum contrast threshold $C_0$ desired at any point of the contrast map of the FTO for a determined useful range of spatial frequencies [-fc; fc] is defined.

second condition on the maximum phase-shift value ($\Phi_0$) of the FTO

A value of a phase-shift threshold $\Phi_0$ limiting the phase-shifts allowed on the phase map of the FTO in the useful range of spatial frequencies [-fc; fc] is defined.

For example, if $\Phi_0$ is fixed equal to 0 rad., no phase-shift is allowed on the FTO in the determined useful range of spatial frequencies [-fc; fc]. If $\Phi_0$ is fixed equal to 2*pi rad., any phase-shift is allowed on the FTO, in particular the contrast inversions, in the determined useful range of spatial frequencies [-fc; fc].

third condition on the average variation of the contrast ($S_0$)

A value of a threshold $S_0$ limiting the longitudinal variations of the contrast averaged in the useful range of spatial frequencies [-fc; fc] is defined.

For example, if $S_0$ is fixed equal to 35%, the average contrast of the contrast map must not fluctuate by more than 35% in the determined useful range of spatial frequencies [−fc; fc].

2) Output Magnitudes

In order to be able to compare the performances of different pupil phase masks in an imaging system, two criteria are defined as a function of the determined useful range of spatial frequencies [−fc; fc], and as a function of the chosen threshold values ($C_0$, $\Phi_0$, $S_0$):

Value of the longitudinal extension of the focusing depth domain (|P|)

The focusing depth domain P is herein defined by the intersection of several domains, themselves defined based on the conditions fixed by $C_0$, $\Phi_0$ and $S_0$. More precisely, the longitudinal extension |P| of the focusing depth domain P is equal to the absolute value of the focusing depth domain P, hence:

|P|=|Pc∩Ps∩Pφ| with Pc, Ps and Pφ defined as follows.

Pc is defined as the greatest longitudinal area for which the first conditions defined by $C_0$ is fulfilled on the contrast map in the whole useful range of spatial frequencies [−fc; fc]. Pc may be interpreted as a measurement of a first focusing depth domain on a criterion of longitudinal holding of a minimal resolution, more or less high according to the holding value for the limit $C_0$. In the case where $C_0$ is zero, |P|=|Ps∩Pφ|.

Pφ is defined as the greatest longitudinal area for which the second condition defined by $\Phi_0$ is fulfilled on the phase map. Pφ can be interpreted as a measurement of a second focusing depth domain on an optional criterion of limitation of the phase-shifts of the FTO over a longitudinal area of the phase map and in the useful range of spatial frequencies [−fc; fc]. In the case where $\Phi_0$ is 2*pi, Pφ is considered as infinite or non-limitative, in this case |P|=|Pc∩Ps|.

Ps is defined as the greatest longitudinal area for which the condition $S_0$ is fulfilled on the contrast map; in case of discontinuity, the greatest extension satisfying the criterion is retained. Ps can be interpreted as a measurement of a third focusing depth domain on a criterion of longitudinal holding of a form of point spread function (PSF), more or less strict according to the value of the defined threshold $S_0$. In the case where $S_0$ is zero, no contrast variation is allowed. In the case where $S_0$ is equal to 100%, any contrast variation is allowed and $P_S$ is considered as infinite or non-limitative, in this case: |P|=|$P_c$∩$P_\varphi$|.

Average contrast ($\overline{C}$)

$$\overline{C} = \langle |FTO| \rangle_{z \in z\_(P)\ and\ fc \in [-f\_c,\ f\_c]}$$

$\overline{C}$ represents the average contrast of the imaging system over the area of the contrast map corresponding to the focusing length domain P. $\overline{C}$ can be interpreted as an indicator of the quality of image of the imaging system on the associated focusing depth domain P.

Let's consider, for example, the reference imaging system consisted of an optical system with no phase mask whose contrast map is shown in FIG. 4A.

For the values of $C_0$=1%, $\Phi_0$=0 rad. and $S_0$=35%, it is obtained |P|=|Ps|=0.55 mm and $\overline{C}$=74% for a useful range of spatial frequencies [−fc; fc] determined by $f_c=f_{det}$=67 (pairs of lines per millimetre or pl/mm).

3) Example of Calculation $C_0$, $\Phi_0$ and $S_0$ are parameters allowing the designer to choose the characteristics of the wanted imaging system, respectively the quality of the modulation transfer function FTM and/or the invariance of the latter.

In a first example of application, it is chosen a value of 1% for the minimum contrast threshold $C_0$, a value of $\Phi_0$ equal to 0 rad. (in other words, the contrast inversions are not allowed) and a value of 35% for the contrast variation threshold $S_0$.

In a second example of application, the contrast variation threshold $S_0$ is favoured with respect to the condition on the first minimum contrast threshold $C_0$=0%. It amounts to favour an imaging system having a longitudinal extension of the focusing depth domain that may be high, but to the potential detriment of the spatial resolution. Such an imaging system (having a relatively less good quality of image) may require a post-processing by deconvolution of the sensed image.

In another example, a high lower limit of contrast $C_0$ may be chosen. This choice amounts to favour the spatial resolution with respect to the longitudinal extension of the focusing depth domain. Such an imaging system is liable to provide an image of good quality without requiring a deconvolution of the sensed image.

The parameters $C_0$, $\Phi_0$ and $S_0$ allow determining the output magnitudes (|P| and $\overline{C}$) that quantify the response of the imaging system, as a function of the focusing defect and as a function of the useful range of spatial frequencies [−fc; fc].

The designer fixes the value of $f_c$, then chooses the input values of the parameters $C_0$, $\Phi_0$ and $S_0$. However, for a given imaging system, there is no unicity of the solution of a phase mask making it possible to fulfil the conditions imposed for a same set of values $C_0$, $\Phi_0$ and $S_0$. The selection of a pertinent phase mask results from an optimization process and from the evaluation of a merit function associated with the optimization process.

Different imaging systems based on the combination of a same optical system and a same image sensor, in a determined optical conjugation, with different pupil phase masks, are simulated. These different imaging systems may be evaluated by an optimization or a minimization process, as a function of the two following parameters: on the one hand, a measurement of the longitudinal extension of the focusing length domain corresponding to |P|, and on the other hand, a measurement of the average image quality corresponding to $\overline{C}$, obtained by the imaging system provided with its pupil phase mask.

An optimization algorithm allows searching for the pupil phase mask (or transmission) profile(s) D(ξ, η) in the equation 2.1, making it possible to modify, for example to increase, the value of longitudinal extension of the focusing depth domain |P| and/or the average contrast $\overline{C}$. This calculation may implement a conventional non-linear optimization (of the Gauss-Newton, or Levenberg-Marquardt type, for example) or an algorithm of genetic type (NDS, Rang, Tournament, biased roulette wheel or other).

The use of an optimization algorithm is generally based on a calculation of a merit function based on the value of longitudinal extension of the focusing depth domain |P| and/or on the average contrast $\overline{C}$.

The proposed method may, for example, allow stabilizing the response of the system for very high focusing defects, while preserving the spatial resolution of the system.

It is also possible to obtain high extensions of the depth of field or focusing depth domain while keeping a very acceptable spatial resolution with no post-processing.

Likewise, the method may be used to strongly reduce the value of longitudinal extension of the focusing depth or depth of field domain of an imaging system, for example in an application of microscopy resolved along the longitudinal axis.

The method can be applied to the definition of any type of phase mask family:
- phase mask with a symmetry of revolution, having a radial profile comprising binary or quantified phase-shiftings, or a polynomial radial profile;
- phase mask with a partial symmetry of revolution, whose profile may be decomposed into angular sectors of variable dimensions, each angular sector having a radial profile comprising binary or quantified phase-shiftings, or a polynomial radial profile.

Once inserted in the optical system for which it has been designed, the pupil phase mask (or phase mask) designed by the method provides a modified depth of field or modified focusing depth, as a function of the values imposed by the designer for the input parameters ($C_0$, $\Phi_0$, $S_0$).

In a first example of application (FIG. 6-9), the coupling of a pupil phase mask 50 deriving from the method described hereinabove allows extending the depth of field domain of an imaging system to reach a focusing defect $|\Psi|\sim40$ rad. with no distortion of the sensed image and with a conservation of the spatial frequencies such that a post-processing is not mandatory to obtain an exploitable image. The focusing depth of the imaging system is hence immediately modified by the insertion of this pupil phase mask.

In another example of application (FIG. 11-12), another pupil phase mask makes it possible to significantly extend the depth of field domain to reach a focusing defect $|\Psi|\sim90$ rad. with no distortion of the image. However, in this case, an image post-processing may be desirable to obtain an image having the desired characteristics of resolution. The focusing depth of the imaging system is hence herein also immediately modified by the insertion of this other pupil phase mask.

The pupil phase mask may be designed to be placed near the pupil plane of the optical system or in a conjugated plane of the latter by another optical system.

The method may be applied to any type of imaging systems. It integrates at the input the desired criteria on the imaging system and takes into account the parameters of the system to be optimized: numerical aperture, focal length, focusing distance, wavelength or spectral range of the imaging optical beam.

In the first example of application, it is searched to increase the focusing depth of an imaging system, which does not mandatory require a post-processing of the image acquired.

By way of illustrative and not-limitative example, a merit function is calculated, of the form $m(C,P)=\overline{C}\cdot|P|^\gamma$:

where $|P|$ represents for each imaging system the value of the longitudinal extension of the focusing depth domain, i.e. of the longitudinal area where the invariance criterion is respected. Experimentally, the power factor $\gamma$ is a real number. This merit function may be implemented in an optimization algorithm that may be, for example, a genetic algorithm. Other optimization algorithms known by the one skilled in the art may be used, such as a multi-criterion optimization algorithm.

First Example of Application

A first exemplary embodiment is described herein, relating to an imaging system comprising an optical system formed of a doublet having a focal length of 600 mm. This optical system is provided with a diaphragm to be able to operate at the aperture F/12, with a radius R of the pupil equal to 25 mm. The images are made at the wavelength $\lambda$=532 nm. The image sensor is a matrix of 2048×2048 pixels, the size of an elementary pixel being a square of 7,4 microns side. The imaging system is in 5 m-681,81 mm conjugation, the image sensor being located in the image plane of the doublet. The pupil phase mask is arranged against one of the diopters of the optical system, near the pupil plane thereof. The cut frequency retained is $f_c$=45 pl/mm (pairs of lines per mm).

The following parameter values are chosen: $C_0$=1%, $\Phi_0$=0 rad and $S_0$=35% over the useful range of spatial frequencies [−fc; fc] of the imaging system.

An optimization algorithm of the genetic type, based on a merit function $m(\overline{C},P)=\overline{C}\cdot P^\gamma$ with a value $\gamma$=1,6 is chosen.

It is started from a bank of predefined profiles and, for each predetermined profile, the value of the associated merit function is determined.

During the execution of the optimization algorithm, an increase of $|P|$ means that the value of longitudinal extension of the focusing depth domain of the imaging system increases, and/or an increase of the average contrast C means that the image quality increases in this focusing depth domain and in the useful range of spatial frequencies.

It is hence determined a first phase mask 50 (FIG. 6) having a profile with a symmetry of revolution about the optical axis of the optical system, having rings with binary phase-shiftings between $\pi$ and $2\pi$. The phase profile of the phase mask 50 used is shown in sectional view in FIG. 7. This phase mask 50 has a maximum radius R of 25 mm and includes about 80 phase rings.

More precisely, the following table indicates the phase-shiftings of the binary phase rings as a function of the radial distance (u) on the phase pupil mask:

| Radial distance u (mm) | Phase-shift D (radians) | Radial distance u (mm) | Phase-shift D (radians) |
|---|---|---|---|
| 0 ≤ u < 11.666667 | $2\pi$ | 17.916667 ≤ u < 18.00000 | $2\pi$ |
| 11.666667 ≤ u < 14.00000 | $\pi$ | 18.00000 ≤ u < 18.083333 | $\pi$ |
| 14.00000 ≤ u < 16.00000 | $2\pi$ | 18.083333 ≤ u < 18.25000 | $2\pi$ |
| 16.00000 ≤ u < 17.166667 | $\pi$ | 18.25000 ≤ u < 18.3333 | $\pi$ |
| 17.166667 ≤ u < 17.25000 | $2\pi$ | 18.3333 ≤ u < 18.50000 | $2\pi$ |
| 17.25000 ≤ u < 17.416667 | $\pi$ | 18.50000 ≤ u < 18.583333 | $\pi$ |
| 17.416667 ≤ u < 17.50000 | $2\pi$ | 18.583333 ≤ u < 18.75000 | $2\pi$ |
| 17.50000 ≤ u < 17.583333 | $\pi$ | 18.75000 ≤ u < 18.833333 | $\pi$ |
| 17.583333 ≤ u < 17.666667 | $2\pi$ | 18.833333 ≤ u < 18.916667 | $2\pi$ |
| 17.666667 ≤ u < 17.750000 | $\pi$ | 18.916667 ≤ u < 19.00000 | $\pi$ |
| 17.750000 ≤ u < 17.833333 | $2\pi$ | 19.00000 ≤ u < 19.083333 | $2\pi$ |
| 17.833333 ≤ u < 17.916667 | $\pi$ | 19.083333 ≤ u < 19.166667 | $\pi$ |
| 19.166667 ≤ u < 19.25000 | $2\pi$ | 22.083333 ≤ u < 22.250000 | $2\pi$ |

-continued

| Radial distance u (mm) | Phase-shift D (radians) | Radial distance u (mm) | Phase-shift D (radians) |
|---|---|---|---|
| 19.25000 ≤ u < 19.416667 | π | 22.250000 ≤ u < 22.333333 | π |
| 19.416667 ≤ u < 19.50000 | 2π | 22.333333 ≤ u < 22.416667 | 2π |
| 19.50000 ≤ u < 19.666667 | π | 22.416667 ≤ u < 22.500000 | π |
| 19.666667 ≤ u < 19.75000 | 2π | 22.500000 ≤ u < 22.583333 | 2π |
| 19.75000 ≤ u < 19.916667 | π | 22.583333 ≤ u < 22.666667 | π |
| 19.916667 ≤ u < 20.00000 | 2π | 22.666667 ≤ u < 22.833333 | 2π |
| 20.00000 ≤ u < 20.083333 | π | 22.833333 ≤ u < 22.916667 | π |
| 20.083333 ≤ u < 20.166667 | 2π | 22.916667 ≤ u < 23.083333 | 2π |
| 20.166667 ≤ u < 20.25000 | π | 23.083333 ≤ u < 23.166667 | π |
| 20.25000 ≤ u < 20.333333 | 2π | 23.166667 ≤ u < 23.333333 | 2π |
| 20.333333 ≤ u < 20.416667 | π | 23.333333 ≤ u < 23.416667 | π |
| 20.416667 ≤ u < 20.50000 | 2π | 23.416667 ≤ u < 23.500000 | 2π |
| 20.50000 ≤ u < 20.583333 | π | 23.500000 ≤ u < 23.583333 | π |
| 20.583333 ≤ u < 20.666667 | 2π | 23.583333 ≤ u < 23.666667 | 2π |
| 20.666667 ≤ u < 20.75000 | π | 23.666667 ≤ u < 23.750000 | π |
| 20.75000 ≤ u < 20.916667 | 2π | 23.750000 ≤ u < 23.833333 | 2π |
| 20.916667 ≤ u < 21.0000 | π | 23.833333 ≤ u < 23.916667 | π |
| 21.0000 ≤ u < 21.083333 | 2π | 23.916667 ≤ u < 24.000000 | 2π |
| 21.083333 ≤ u < 21.166667 | π | 24.000000 ≤ u < 24.083333 | π |
| 21.166667 ≤ u < 2.1250000 | 2π | 24.083333 ≤ u < 24.166667 | 2π |
| 2.1250000 ≤ u < 21.333333 | π | 24.166667 ≤ u < 24.250000 | π |
| 21.333333 ≤ u < 21.416667 | 2π | 24.250000 ≤ u < 24.333333 | 2π |
| 21.416667 ≤ u < 21.583333 | π | 24.333333 ≤ u < 24.416667 | π |
| 21.583333 ≤ u < 21.666667 | 2π | 24.416667 ≤ u < 24.500000 | 2π |
| 21.666667 ≤ u < 21.750000 | π | 24.500000 ≤ u < 24.583333 | π |
| 21.750000 ≤ u < 21.833333 | 2π | 24.583333 ≤ u < 24.666667 | 2π |
| 21.833333 ≤ u < 21.916667 | π | 24.666667 ≤ u < 24.750000 | π |
| 21.916667 ≤ u < 22.000000 | 2π | 24.750000 ≤ u < 24.833333 | 2π |
| 22.000000 ≤ u < 22.083333 | π | 24.833333 ≤ u < 24.916667 | π |
|  |  | 24.916667 ≤ u < 25.0000 | 2π |

FIG. 7 shows the radial phase profile used for the manufacturing of the first example of pupil phase mask as defined in the above-mentioned table.

It is observed that a mask having a complementary phase profile, i.e. having, for each ring, a phase of opposite sign and of same module as in the above table, produces an identical result.

Moreover, a phase mask having an unfolded phase profile, for example in an increasing or decreasing manner from the centre towards the outside, wherein, for each ring, the value of the phase is equal to the value indicated in the above table, modulo $2\pi$, also produces an identical result.

Finally, a mask including a combination of phase values that are identical to each other, complementary to each other and/or modulo $2\pi$ with respect to each other also produces an identical result.

FIG. 8A represents the contrast map for an imaging system comprising the phase mask, whose phase profile is shown in FIG. 7 as a function of the spatial frequency f and of the focusing defect z. Compared with FIG. 4A, an increase of the contrast C(f, z) is observed in the useful range of spatial frequencies [−fc; fc]. FIG. 8A allows determining the focusing depth domain Pc, associated with the retained criterion $C_0$: $|P_C|=8,36$ mm (corresponding to $|\Psi|\sim40$). FIG. 8B represents a curve of longitudinal profile of averaged contrast $C_{fc}(z)$ in the useful range of spatial frequencies [−fc; fc] as a function of the focusing defect. FIG. 8B allows determining the focusing depth domain Ps as a function of the predetermined threshold $S_0$, herein $|P_S|=7,88$ mm. Similarly, the focusing depth domain $P_\Phi$, associated with the retained criterion $\Phi_0$, is determined, it is found herein: $|P_\Phi|=8,26$ mm.

The focusing depth domain P is deduced from the intersection of the focusing depth domain Pc, of the focusing depth domain $P_\Phi$ and of the focusing depth domain Ps.

It is to be noted that the focusing depth domain Pc and/or Ps and/or Pφ and/or P is generally not symmetrical with respect to the focusing plane ($Z=Z_0$).

Hence, the addition of the mask having the radial profile of FIG. 7 makes appear a value of longitudinal extension of the focusing depth domain, i.e. a longitudinal interval of extension $|P|=|P_C \cap P_S|=7,88$ mm. With identical input magnitudes $C_0$ and $S_0$, the system with no mask has a value of longitudinal extension of the focusing depth domain $|P|=|P_C \cap P_\varphi \cap P_S|=|P_S|=0,65$ mm. An increase of the longitudinal extension of the focusing depth domain by a factor higher than 10 is hence obtained, with no post-processing. In practice, the increase of longitudinal extension of the focusing depth domain induces no distortion of the image; it allows such a conservation of the spatial frequencies that a post-processing is not mandatory to obtain an exploitable image. The addition of this first example of phase mask in an imaging system hence allows modifying immediately the focusing depth domain (or, equivalently, by application of the formulas of optical conjugation, modifying the depth of field domain) and without affecting significantly the luminosity of the imaging system.

FIGS. 9A-9R show Siemens test chart images acquired by means of the imaging system comprising the first example of phase mask 50 shown in FIGS. 6 and 7, these images being obtained with no post-processing. FIGS. 9A to 9R are obtained for the same focusing defects as FIGS. 5A to 5R, respectively, the only difference between FIGS. 5 and 9 being the addition of the phase mask for FIG. 9.

The images experimentally acquired are in concordance with the simulations of this imaging system.

In FIG. 9A, in the focusing plane of the imaging system with a phase mask, it is observed a reduction of the contrast by comparison with FIG. 5A of the same imaging system with no optical component. Nevertheless, for a high focusing defect in FIG. 9P (corresponding to $|\Psi|\sim40$), it is observed a very marked improvement of the contrast compared with FIG. 5P. Thanks to this imaging system with a phase mask (as represented in FIG. 7) and with no image post-processing, it is effectively obtained an invariance of the contrast of the images over an extended range of spatial frequencies.

With the same phase mask and the same optical imaging system as described in relation with FIG. 7, it is applied to the sensed and digitized images, an additional step of digital post-processing. This post-processing is for example based on a processing of the Wiener filtering type by the average PSF of the imaging system provided with the phase mask resulting from the method of calculation and from the optimization algorithm. As an alternative, a post-processing of deconvolution of the Lucy-Richardson type or blind deconvolution may be applied based on an average PSF over the field and with no hypothesis about the phase mask selected.

An object of this post-processing is for example to improve the resolution or the signal-to-noise ratio of the image.

FIGS. 10A to 10R show the results of this image post-processing applied to the sensed and digitized images as shown in FIGS. 9A to 9R, and, for the same focusing defects as FIGS. 9A to 9R, respectively, the only difference between FIGS. 9 and 10 being the additional step of post-processing for FIG. 10.

It can be noted in FIGS. 10A-10R that the Siemens test chart does no longer appear blurred, but perfectly neat, in the range of focusing defect up to $|\Psi|\sim40$, including at the centre of the test chart (FIGS. 10C, 10F, 10I, 10D, 10O, 10R), i.e. for the high spatial frequencies.

Second Example of Application

In the second example of application, the contrast variation threshold $S_0$ is favoured with respect to the condition on the contrast threshold $C_0$. It amounts to favour an imaging system having a value of longitudinal extension of the focusing depth domain $|P|$ that may be high, but to the potential detriment of the spatial resolution. Such an imaging system (having a relatively less good quality of image) may require a post-processing by deconvolution of the sensed image.

More precisely, in this second example of application, the same optical system and the same image sensor as in the first example of application are chosen. The radius of the pupil is brought to 50 mm (aperture number F/6) and the input magnitudes are fixed to $C_0=0\%$, $\Phi_0=0$ rad. and $S_0=65\%$. The value $C_0=0\%$ does not place any constraint on the minimum contrast threshold. The value $\Phi_0=0$ rad. maintains the constraint on the phase map (no contrast inversion). The value of the threshold $S_0=65\%$ is relatively high and allows higher variations of the average contrast in the useful range of spatial frequencies. The phase profile found that way has a radial profile schematically shown in FIG. 11. This second example of phase mask 50 has a maximum radius of 50 mm and includes about sixty phase rings having binary phase-shiftings between $\pi$ and $2\pi$.

FIGS. 12A to 12R show Siemens test chart images acquired by means of the imaging system comprising the second example of phase mask, whose radial phase profile is shown in FIG. 11. The images 12A to 12R have been obtained with a post-processing of the same type as that applied in FIGS. 10A-10R.

The images 12A, 12B, 12C illustrate images of a Siemens test chart for a focusing defect $|\Psi|=\pm0.239$ rad. FIGS. 12D, 12E, 12F illustrate images of the same Siemens test chart for a focusing defect $|\Psi|=\pm18.7$ rad. FIGS. 12G, 12H, 12I illustrate images of the same Siemens test chart for a focusing defect $|\Psi|=\pm37.7$ rad. FIGS. 12J, 12K, 12L illustrate images of the same Siemens test chart for a focusing defect $|\Psi|=\pm56.7$ rad. FIGS. 12M, 12N, 12O illustrate images of the same Siemens test chart for a focusing defect $|\Psi|=\pm75.7$ rad. FIGS. 12P, 12Q, 12R illustrate images of Siemens test chart for a focusing defect $|\Psi|=\pm94.7$ rad.

This second example of phase mask allows an increasing of the depth of field corresponding to a focusing defect of $|\Psi|\sim97$.

Variants and Other Examples of Application

In a variant, the profile of the pupil phase mask is optimized at several wavelengths or over a spectral range of wavelengths. This variant finally finds applications in the optical systems used over a wide spectral range, for example the visible spectrum or in spectrometry devices.

An application of this variant relates the manufacturing of ophthalmic lenses, in which the external diopter of the ophthalmic lens is manufactured so as to form a phase mask, so as to modify the depth of field of the imaging system consisted by the ophthalmic lens, the anterior part of the eye and the crystalline lens, the image sensor being the retina of the user. In another application of the ophthalmologic field, the phase mask is directly engraved on the natural or synthetic crystalline lens, for example by a method of laser ophthalmologic processing. Hence, an increase of the depth of field advantageously allows compensating a very reduced reserve of accommodation in certain patients.

In another application, a profile of phase mask for an optical imaging system is determined according to the method described hereinabove, but for another purpose: the selective filtering of certain spatial frequencies. For that purpose, the spatial frequency(ies) for which a contrast lower than the threshold value is determined.

In another application, it may be desirable to reduce the depth of field of an imaging system. This case exists for example in microscopy, when it is desired to obtain images resolved in depth with a resolution lower than the usual depth of field of the imaging system. The coupling of a phase mask allows modifying the depth of field without reducing the spatial resolution in this limited area.

The method of the invention is advantageously interfaced with a software of calculation of an optical system, such as the Zemax software or an equivalent. Hence, the designer of an imaging system has a software allowing both combining a simulation of the ray tracing in the imaging system and an optimization of a compromise between the image quality and the depth of field (or the focusing depth).

Device

The spatial filter is advantageously in the form of a phase mask intended to be inserted in an existing imaging system. If the pupil of the optical system is accessible, this spatial filter is preferably arranged in the pupil plane or near the pupil plane. If the pupil of the optical system is accessible, another optical system (with lenses, mirror or other) is arranged so that the spatial filter is optically conjugated with the pupil plane of the imaging system. Optionally, this other optical system may produce an optical magnification. Hence, a pupil phase function is performed in combination with the imaging system.

The phase mask may be made easily by different techniques of manufacturing: for example, by lithography or by ionic etching or by diamond machining of a support. Such a phase mask may be easily replicated by moulding for a low-cost series production. It is determined, as a function of the refractive index of the optical material of the support, the thickness corresponding to the desired phase-shift at the wavelength λ of use. In an exemplary embodiment, the support of the phase mask is consisted of a glass blade with planar and parallel faces. As an alternative and particularly advantageous manner, the phase mask may be manufactured directly on a dioptre of the optical system.

In an example of application, the phase mask obtained according to the method described hereinabove is made directly on the convex face of an ophthalmic lens. In this case, the image sensor being the eye of a person, a phase mask design requiring no image post-processing is favoured.

In the case of a mask consisted of phase rings with binary phase-shiftings, for example between 0 and π, it is very easy and not expensive to manufacture rings introducing a phase-shift D of 0 or π in transmission. In the case of a mask consisted of phase rings with discrete phase-shiftings of π/N, where N is an integer higher than or equal to 2, the manufacturing method is generally performed by successive steps and more expensive to perform compared to a binary phase mask.

A pupil mask may be made on a blade of a refractive material at the wavelength of use by known techniques of photolithography with an excellent transverse accuracy and of phase-shift. The tolerances of manufacturing do not pose particular difficulties to the one skilled in the art in the field of manufacturing of components for the microelectronic or the optoelectronic. This mask may then be replicated by moulding in many copies and at a very low cost of manufacturing.

The phase mask may also be generated dynamically on an active component such as a spatial phase modulator, for example based on a matrix of liquid crystals or a deformable mirror, wherein a local phase variable on demand may be controlled via an electronic module. This embodiment is particularly interesting in the imaging system having a variable aperture and/or a variable focal length or a variable spectral response, for example the cameras provided with a diaphragm of variable aperture, a zoom or a variable-magnification microscope or a spectrometer. In this case, a series of phase masks optimized for a series of aperture values and/or of focal length and/or of magnification and/or of spectral range is calculated in advance, and the spatial phase modulator is controlled so as to generate the optimized phase mask corresponding to the desired conditions of use.

The invention claimed is:

1. A method of designing an imaging system comprising an optical system having a longitudinal optical axis, an image sensor and a spatial filter, the imaging system being configured so as to form an image of a focusing plane on the image sensor, the method comprising the following steps:
   a) initializing a longitudinal position ($z_0$) of the focusing plane and a longitudinal position ($z'_0$) of the image sensor, the optical system optically conjugating the longitudinal position ($z_0$) of the focusing plane and the longitudinal position ($z'_0$) of the image sensor on the longitudinal optical axis;
   b) initializing a pupil phase function of the spatial filter in the pupil plane of the optical system,
   c) calculating an optical transfer function (FTO) of the optical system combined with the spatial filter, as a function of spatial frequency (f) and of a focusing defect (Ψ);
   d) determining a contrast map and a phase map, the contrast map being equal to the module of the optical transfer function (FTO) as a function of spatial frequency (f) and of the focusing defect (Ψ), and the phase map representing an argument of the optical transfer function (FTO) as a function of spatial frequency (f), and of the focusing defect (Ψ);
   e) determining, from the contrast map and/or the phase map obtained at step d), a focusing depth domain (P) of the imaging system in a useful range of spatial frequency ([−fc; fc]) and calculating a value of longitudinal extension (|P|) of said focusing depth domain (P);
   f) evaluating a merit function of said pupil phase function of the spatial filter as a function of the value of longitudinal extension (|P|) of the focusing depth domain of the imaging system in the useful range of spatial frequencies ([−fc; fc]);
   g) reiterating the steps b) to f) for another pupil phase function of the spatial filter;
   h) selecting, from a plurality of evaluations of the merit function corresponding to a plurality of pupil phase functions of the spatial filter, respectively, a determined pupil phase function allowing the imaging system to have a determined value of longitudinal extension (|P|) of the focusing depth domain (P) in the useful range of spatial frequencies ([−$f_c$; $f_c$]).

2. A method of designing an imaging system according to claim 1, wherein step d) comprises the following steps:
   i) initializing a contrast threshold ($C_0$), a phase-shift threshold ($Φ_0$) and a contrast average variation threshold ($S_0$);
   j) determining, from the contrast map calculated at step d), a first focusing depth domain (Pc), for which the contrast value is higher than or equal to the contrast threshold (|$C_0$|) in the useful range of spatial frequencies ([−fc; fc]);
   k) determining, from the phase map calculated at step d), a second focusing depth domain ($P_φ$), for which a phase is lower than or equal to the phase-shift threshold ($Φ_0$) in the useful range of spatial frequencies ([−fc; fc]);
   l) determining a third focusing depth domain (Ps), for which the average variation of contrast averaged in the useful range of spatial frequencies ([−fc; fc]) is lower than or equal to the contrast average variation threshold ($S_0$);
   wherein step e) comprises the following step:
   m) determining the focusing depth domain (P) by intersecting the first focusing depth domain (Pc) with the second focusing depth domain ($P_φ$) and with the third focusing depth domain ($P_S$), and
   wherein step f) comprises the following step:
   n) calculating, as a function of the focusing defect (Ψ), the average contrast ($\overline{C}$) of the imaging system averaged in the useful range of spatial frequencies ([−$f_c$; $f_c$]) and for said focusing depth domain (P) determined at step m);
   o) evaluating a merit function representative of said pupil phase function of the spatial filter, the merit function being function of the value of longitudinal extension (|P|) of the focusing depth domain (P) of the imaging system determined at step m), and of the average contrast ($\overline{C}$) calculated at step n) in the useful range of spatial frequencies ([−fc; fc]).

3. A method of designing an imaging system according to claim 1, wherein the pupil is of circular shape centred on the optical axis, and wherein the pupil phase function of the spatial filter has a symmetry of revolution about the longitudinal optical axis or a partial symmetry of revolution, the pupil phase function of the spatial filter being decomposed into angular sectors.

4. A method of designing an imaging system according to claim 1, wherein the pupil phase function of the spatial filter includes a series of discrete phase values.

5. A method of designing an imaging system according to claim 4, wherein the pupil phase function of the spatial filter includes binary phase values.

6. A method of designing an imaging system according to claim 1, wherein the pupil phase function of the spatial filter is a polynomial function of the radial distance with respect to the centre of the pupil.

7. A method of designing an imaging system according to claim 1, wherein the pupil of the optical system is asymmetric about the longitudinal optical axis.

8. A method of designing an imaging system according to claim 1, wherein step g) of evaluating the merit function includes a step of calculating a product of the value of longitudinal extension (|P|) of the focusing depth domain (P) by the average contrast ($\overline{C}$) affected by a digital power coefficient ($\gamma$), the digital power coefficient ($\gamma$) being a real number.

9. A method of designing an imaging system according to claim 1, including a step of determining a value of longitudinal extension of the depth of field domain as a function of the value of longitudinal extension (|P|) of the focusing depth domain (P).

10. A spatial filter for an imaging system comprising an image sensor and an optical system having a pupil plane, the spatial filter being intended to be placed in the pupil plane or in a plane optically conjugated with the pupil plane, the spatial filter having a profile with a symmetry of revolution about an optical axis of the optical system, the spatial filter including about 60 to about 80 phase rings with binary phase-shiftings between $\pi$ and $2\pi$, the spatial filter forming a phase mask in the pupil plane adapted to modify a contrast map and/or a phase map of the imaging system over a focusing depth domain (P) and over a useful range of spatial frequencies ([−fc; fc]), the contrast map representing the module of the optical transfer function (FTO) of the optical system combined with the spatial filter, as a function of the spatial frequency (f), and on of the focusing defect ($\Psi$), respectively the phase map representing the phase of the optical transfer function (FTO) of the optical system combined with the spatial filter as a function of the spatial frequency (f) and of the focusing defect ($\Psi$), the spatial filter when placed in the pupil plane or in a plane optically conjugated with the pupil plane of the imaging system providing a value of longitudinal extension (|P|) of the focusing depth domain (P) higher by a multiplication factor at least equal to 10, than the geometrically calculated focusing depth (PM) of said imaging system without said spatial filter.

11. An imaging system comprising:
an optical system;
an imaging sensor; and
a spatial filter arranged near a pupil plane of the optical system or in a plane optically conjugated with the pupil plane of the optical system;
the imaging system being configured to form an image of a focusing plane on the image sensor,
wherein the spatial filter forms, in the pupil plane, a phase mask having a pupil phase function, the spatial filter having a profile with a symmetry of revolution about an optical axis of the optical system, the spatial filter including about 60 to about 80 phase rings with binary phase-shiftings between $\pi$ and $2\pi$, said pupil phase function being determined so that the optical system combined with the spatial filter has a focusing depth domain (P) determined over a useful range of spatial frequencies ([−fc; fc]) having a value of longitudinal extension (|P|) of the focusing depth domain (P) higher by a multiplication factor at least equal to 10, than the geometrically calculated focusing depth (PM) of said imaging system without said spatial filter.

12. An imaging system according to claim 11, further including an image acquisition system adapted to acquire a digital image sensed by the image sensor and an image processing system configured to apply a digital post-processing to the digital image acquired by the image acquisition system, the digital post-processing being function of the spatial filter associated with said value of longitudinal extension (|P|) of the focusing depth domain (P) and with the average contrast ($\overline{C}$).

13. An imaging system according to claim 11, including a spatial phase modulator, the spatial phase modulator being configured to form said spatial filter and said spatial phase modulator being able to be dynamically modulated.

14. A method of designing an imaging system according to claim 3, wherein the pupil phase function of the spatial filter includes a series of discrete phase values.

15. A method of designing an imaging system according to claim 14, wherein the pupil phase function of the spatial filter includes binary phase values.

16. A method of designing an imaging system according to claim 3, wherein the pupil of the optical system is asymmetric about the longitudinal optical axis.

17. A method of designing an imaging system according to claim 3, wherein step g) of evaluating the merit function includes a step of calculating the product of the value of longitudinal extension (|P|) of the focusing depth domain (P) by the average contrast ($\overline{C}$) affected by a digital power coefficient ($\gamma$), this digital power coefficient ($\gamma$) being a real number.

18. A method of designing an imaging system according to claim 8, including a step of determining a value of longitudinal extension of the depth of field domain as a function of the value of longitudinal extension (|P|) of the focusing depth domain (P).

19. A method of designing an imaging system according to claim 2, wherein the pupil is of circular shape centred on the longitudinal optical axis, and wherein the pupil phase function of the spatial filter has a symmetry of revolution about the longitudinal optical axis or a partial symmetry of revolution, the pupil phase function of the spatial filter being decomposed into angular sectors.

20. A method of designing an imaging system according to claim 2, wherein the pupil phase function of the spatial filter includes a series of discrete phase values.

* * * * *

UNITED STATES PATENT AND TRADEMARK OFFICE
CERTIFICATE OF CORRECTION

PATENT NO. : 10,095,027 B2
APPLICATION NO. : 15/193400
DATED : October 9, 2018
INVENTOR(S) : Pierre-Antoine Frugier et al.

It is certified that error appears in the above-identified patent and that said Letters Patent is hereby corrected as shown below:

On the Title Page

Left column:
"(73) Assignee: COMMISSARIAT A L'ENERGIE ATOMIQUE ET AUX ENERGIES ALTERNATIVES, Paris (FR)"

Should be replaced with:
-- (73) Assignees: COMMISSARIAT A L'ENERGIE ATOMIQUE ET AUX ENERGIES ALTERNATIVES, Paris (FR);
CENTRE NATIONAL DE LA RECHERCHE SCIENTIFIQUE, Paris (FR) --.

Signed and Sealed this
Nineteenth Day of February, 2019

Andrei Iancu
*Director of the United States Patent and Trademark Office*